United States Patent
Wilhelmsson

(10) Patent No.: US 11,267,319 B2
(45) Date of Patent: Mar. 8, 2022

(54) ADJUSTABLE AIR VENT

(71) Applicant: Volvo Car Corporation, Gothenburg (SE)

(72) Inventor: Henrik Wilhelmsson, Hisings Kara (SE)

(73) Assignee: Volvo Car Corporation, Gothenburg (SE)

( * ) Notice: Subject to any disclaimer, the term of this patent is extended or adjusted under 35 U.S.C. 154(b) by 117 days.

(21) Appl. No.: 16/441,190

(22) Filed: Jun. 14, 2019

(65) Prior Publication Data
US 2020/0009944 A1  Jan. 9, 2020

(30) Foreign Application Priority Data

Jul. 6, 2018 (EP) .................................... 18182175

(51) Int. Cl.
*B60H 1/34* (2006.01)
(52) U.S. Cl.
CPC ........... *B60H 1/3421* (2013.01); *B60H 1/345* (2013.01)
(58) Field of Classification Search
CPC ........ B60H 1/3421; B60H 1/34; B60H 1/345; B60H 1/3414; B60H 1/3428; B60H 2001/00092; B60H 2001/3464; B60H 2001/3471; B60H 2001/3478; F24F 13/15; F24F 13/075
See application file for complete search history.

(56) References Cited

U.S. PATENT DOCUMENTS 3,456,574 A * 7/1969 Jakeway ................. F24F 13/15
 454/315
6,736,719 B1 * 5/2004 Gehring ............... B60H 1/3421
 454/143

(Continued)

FOREIGN PATENT DOCUMENTS

DE   102017111011 A1   7/2017
DE   102016116356 A1 *  3/2018   ............. B60H 1/242

(Continued)

OTHER PUBLICATIONS

Jan. 11, 2019 European Search Report issue on International Application No. EP18182175.

*Primary Examiner* — Vivek K Shirsat
*Assistant Examiner* — Benjamin Trettel
(74) *Attorney, Agent, or Firm* — Clements Bernard Walker; Christopher L. Bernard

(57) ABSTRACT

An adjustable air vent adapted to guide an air stream flowing through the air vent includes an elongate housing extending in a length direction, one or more vertical vanes at least partly located in the housing, one or more horizontal vanes at least partly located in the housing, an air guide at least partly located in the housing and extending in the length direction, and an air adjustment actuator displaceable in relation to the housing to adjust a direction of the air stream. The air vent includes a first connection directly or indirectly connecting the air adjustment actuator to the horizontal vanes for vertical direction of the air stream and a second connection directly or indirectly connecting the air adjustment actuator to the vertical vanes for horizontal direction of the air stream. The air adjustment actuator surrounds the air guide and is displaceable relative thereto.

16 Claims, 9 Drawing Sheets

(56) References Cited

U.S. PATENT DOCUMENTS

| | | | |
|---|---|---|---|
| 7,997,964 B2 * | 8/2011 | Gehring | ................ B60H 1/345 |
| | | | 454/155 |
| 9,764,622 B2 * | 9/2017 | Noichl | ................ B29C 45/1635 |
| 2006/0172680 A1 | 8/2006 | Gehring et al. | |
| 2006/0217054 A1 * | 9/2006 | Hoehn | ................ F24F 13/065 |
| | | | 454/127 |
| 2013/0078900 A1 * | 3/2013 | Zalan | ................ B60H 1/3421 |
| | | | 454/152 |
| 2013/0165034 A1 | 6/2013 | Jang et al. | |
| 2016/0200178 A1 * | 7/2016 | Londiche | ................ C22C 38/06 |
| | | | 454/154 |
| 2016/0288624 A1 * | 10/2016 | Albin | ................ B60H 1/3421 |
| 2018/0056756 A1 * | 3/2018 | Schaal | ................ B60H 1/3414 |
| 2018/0086182 A1 * | 3/2018 | Gareis | ................ B60H 1/3421 |

FOREIGN PATENT DOCUMENTS

| | | | | |
|---|---|---|---|---|
| DE | 102016116356 A1 | | 3/2018 | |
| DE | 102018205881 B3 * | | 5/2019 | ............. F24F 13/14 |
| EP | 3378686 A1 * | | 9/2018 | ........... F24F 13/065 |
| FR | 3054491 A1 | | 2/2018 | |

\* cited by examiner

ADJUSTABLE AIR VENT

CROSS-REFERENCE TO RELATED APPLICATION

The present disclosure claims the benefit of priority of co-pending European Patent Application No. 18182175.2, filed on Jul. 6, 2018, and entitled "ADJUSTABLE AIR VENT," the contents of which are incorporated in full by reference herein.

TECHNICAL FIELD

The present disclosure relates to an adjustable air vent for a vehicle. The air vent may be included in a dashboard of the vehicle, e.g. forming an integral part thereof.

BACKGROUND

Air vents are utilized in a vehicle in order to provide a passenger compartment and/or a storage compartment with air from outside the vehicle and/or from an HVAC system. Thereby an air stream flows through the air vent and enters the passenger compartment and/or storage compartment. Sometimes it is desirable to be able to adjust the direction of the air stream. This is typically obtained by adjusting the position and/or degree of tilting for one or more vertical vanes and/or horizontal vanes. The vanes are typically adjusted by means of an air adjustment actuator operationally directly or indirectly connected to the vertical vanes and/or horizontal vanes.

The air adjustment actuator may be located at or in the air vent itself, as e.g. is known from patent document US 2013/0165034 A1. However, in the embodiments disclosed therein, the air adjustment actuator partly blocks the air flow from the discharge opening of the air vent. Further, the adjustment of the vanes is restricted to vertical adjustment and/or horizontal adjustment and no direction therebetween.

As an alternative location, the air adjustment actuator may be located in the dashboard beside the discharge opening of the air vent, e.g. as disclosed in patent document US 2006/0172680 A1. However, in such solutions, the air adjustment actuator is connected to the vanes via a rather complicated mechanical linkage system. Further, extra space is needed on the dashboard for the air adjustment actuator.

Document DE 10 2016 116 356 A1 discloses an air vent for ventilating a passenger compartment of a motor vehicle. The air vent has a housing in which a fixed air divider is arranged dividing the housing into two air ducts leading to an air outlet opening of the air vent. For directing an air flow, pivotable lamellae are arranged in the two air ducts and a louver is arranged in front of the air divider, whereby an air flow from the air outlet opening can be directed in all directions. However, there are no details given in the document about how the adjustment of the pivotable lamellae and the louver is controlled.

Even though many variants of adjustable air vents are known from prior art, it is nevertheless desirable to provide an improved adjustable air vent, which allows the exiting air stream to be directed in all directions, which avoids complicated linkage systems between the air adjustment actuator and the vanes and which only minimally blocks the air flow from the air discharge opening of the air vent.

SUMMARY

The object of the present disclosure is to overcome or ameliorate at least one of the disadvantages of the prior art, or to provide a useful alternative.

The present disclosure relates to an adjustable air vent which is adapted to guide an air stream flowing through the air vent. The air vent includes an elongate housing extending in a length direction, one or more vertical vanes at least partly located in the housing, one or more horizontal vanes at least partly located in the housing, an air guide at least partly located within the housing fixedly positioned in relation to the housing and extending in the length direction, and an air adjustment actuator being displaceable in relation to the housing to adjust a direction of the air stream. The air vent further includes a first connection directly or indirectly connecting the air adjustment actuator to the one or more horizontal vanes for vertical direction of the air stream. The air vent further includes a second connection directly or indirectly connecting the air adjustment actuator to the one or more vertical vanes for horizontal direction of the air stream. The air adjustment actuator surrounds the air guide and is displaceable relative thereto, preferably rotationally displaceable.

The air vent may be mounted in a vehicle, such as a car. The air vent may e.g. be located in the dashboard of the vehicle or in a side wall of a vehicle compartment. The housing, or one or more portions thereof, may form an integral part of the dashboard/side wall, e.g. being moulded at the same time. As an alternative, the housing may be integrated with the dashboard/side wall, e.g. being mounted in an opening or a recess of the dashboard/side wall. Thereby, an air discharge opening of the air vent may be flush with a surface of the dashboard/side wall. It would also be possible to utilize the air vent according to the disclosure in other vehicles than a car, e.g. a bus, a truck, a lorry, a working machine, an aircraft or a vessel.

The air guide is fixedly positioned in relation to the housing and is at least partly located inside the housing, optionally completely inside the housing, and extends in the length direction of the housing. The air guide is utilized to divide the air stream into an upper air channel above the air guide and a lower air channel below the air guide. The air guide is preferably located at or adjacent to a longitudinal centre line of the housing. This location of the air guide is suitable for air vents in which it is desirable to be able to guide an equal amount of air above and below the air guide.

The air vent includes a plurality of adjustable vanes, i.e. at least one vertical vane and at least one horizontal vane. If a plurality of vertical vanes, e.g. a number in the range of from 2 to 20, or from 4 to 10, are provided, they may extend parallel to each other, preferably equidistantly spaced apart. It would also be possible to utilize a plurality of horizontal vanes, e.g. 2, 3, 4 or 5. The horizontal vanes may in that case be located side by side and/or above/below each other. The number of vertical vanes and/or the number of horizontal vanes may be adapted to the shape of the housing. In a housing having a larger width than height, the number of vertical vanes is normally greater than the number of horizontal vanes. In an embodiment, the housing is elongate as seen in its length direction and a plurality of vertical vanes and a single horizontal vane are provided.

The air adjustment actuator may be located at the centre of the air discharge opening, as seen in the length direction of the housing. However, it would also be feasible to position the air adjustment actuator in any arbitrary position along the air guide as seen in the length direction of the housing. More than one air adjustment actuator may be arranged in the air vent, each of them controlling a subgroup of the adjustable vanes.

Air typically enters the air vent from an HVAC system of the vehicle and/or from ambient air. The air typically exits into a passenger compartment of the vehicle through the air discharge opening. The air adjustment actuator is utilized to adjust the direction of the air stream exiting the air vent. The adjustment of the direction is obtained by displacing the air adjustment actuator relative to the air guide and thus also relative to the housing. Preferably, this displacement includes a rotational displacement. By utilizing an air vent according to the disclosure, it is possible to make a stepless adjustment in any direction, i.e. not only vertically and/or horizontally as known from some prior art solutions.

Further, the air vent according to the disclosure makes it possible to use a continuous air guide and, yet, avoid complicated linkage systems between the air adjustment actuator and the vanes. In addition, the air adjustment actuator of the air vent according to the disclosure only minimally blocks the air flow from the air discharge opening of the air vent.

Typically the air vent is mounted in the vehicle in such a way that the directions of the air vent herein denoted "vertical" and "horizontal" coincide with the vertical and horizontal directions of the vehicle when standing on flat ground, however, the air vent may be mounted in any direction in the vehicle. Further, even if it is preferred that the vane/s denoted "vertical" are perpendicular to the vane/s denoted "horizontal", the vanes may instead differ by another angle than 90°, e.g. in the range of from 30° to 90°.

The air guide may extend continuously in the length direction within the housing. Preferably, the air guide may extend along the whole length or substantially the whole length of the housing. By utilizing the air vent according to the disclosure, it is possible to use a continuous air guide even if it extends along a full length of the housing. In that case, the air guide forms an unbroken line, which may be visible through the air discharge opening.

The air guide may be located downstream of the adjustable vanes, as seen in a flow direction through the air vent. Preferably, the air guide is located downstream of the one or more vertical vanes, which in turn are located downstream of the one or more horizontal vanes. The vertical vane/s may include an upper portion and a lower portion, which protrude above and below the air guide and/or the horizontal vane, respectively. In this case, the order of the vanes as seen in the flow direction is given by the centres of their pivotal adjustment displacement, i.e. the rotation axes. Such configurations make it possible to have a rather compact air vent.

The first connection may include a spindle forming a first rotation axis of the air adjustment actuator. The spindle extends in the length direction of the housing and has a fixed position relative to the air guide. The spindle is rotatable around its length axis. The spindle may be located within the air guide. Thereby it is possible to have a rather compact air vent. Further, the air guide helps to protect the spindle.

The spindle is directly or indirectly connected to the horizontal vane/s. A direct connection may be via a first connection portion attached to the spindle and a second connection portion attached to the horizontal vane, e.g. by cogs engaging with corresponding cogs of the horizontal vane. A pivotal up/down-displacement of the air adjustment actuator via rotation around the first rotation axis is transferred to an up/down tilting of the horizontal vane/s, which influences how much air flows above and below the air guide, respectively. Thereby, the vertical direction of the air stream, i.e. if the air stream exits the air vent upwards or downwards, is adjusted. The vertical adjustment may be made steplessly.

The air adjustment actuator may include one or more portions forming a second rotation axis of the air adjustment actuator, the second rotation axis extending in a direction perpendicular to the length direction of the housing, when the air vent is in a neutral position. The neutral position is the position in which the air stream is directed straight outwards from the air vent. The second rotation axis is rotatable around its length axis. A pivotal displacement of the air adjustment actuator to the left or right via rotation around the second rotation axis is transferred to a left/right tilting of the vertical vane/s, which influences the horizontal direction of the air stream, i.e. if the air stream exits the air vent to the right or to the left. The horizontal adjustment may be made steplessly.

By simultaneously displacing the air adjustment actuator up/down and left/right and thus combining the vertical and horizontal adjustments, any direction of the exiting air stream may be obtained. The combined displacement may be performed steplessly.

The second rotation axis may be rotatable around the first rotation axis. Accordingly, during the above-described up/down-displacement of the air adjustment actuator via rotation around the first rotation axis leading to an up/down tilting of the horizontal vane/s, the second rotation axis follows the displacement of the air adjustment actuator and thus rotates around the first rotation axis.

The second rotation axis may be located upstream of the first rotation axis as seen in the flow direction through the air vent, preferably adjacent to the first rotation axis. Thereby, the centres of their respective rotational displacements are close to each other.

The air adjustment actuator may have a closed circumference surrounding the air guide, e.g. being circular. In principle, the air adjustment actuator may have any shape as long as it is possible to reach by a user to be adjusted, surrounds the air guide and can be displaced within a predefinable adjustment range without interfering with the housing.

The second connection may include, or be constituted by, a bar extending in the length direction of the housing and connecting the air adjustment actuator to the one or more vertical vanes. If having more than one vertical vane, the bar is preferably connected to each vertical vane to be adjusted, such that they can be displaced in synchrony.

When moving the air adjustment actuator to the right or to the left, the air adjustment actuator rotates around the second rotation axis. Thereby, the bar is linearly displaced in the length direction of the housing and the vertical vanes are tilted correspondingly by means of the bar. Accordingly, the air stream is directed obliquely to the right or to the left when exiting the air vent through the air discharge opening. The horizontal displacement may be made steplessly.

The bar may include a recess adapted to receive a portion of the air adjustment actuator, the recess preferably being U-shaped. The size and shape of the recess is adapted to allow free movement, e.g. rotation and/or tilting, of the air adjustment actuator within the recess.

The air adjustment actuator may include a tubular structure forming part of its outer circumference, the surface of which has a first curvature, e.g. a circular curvature with a first radius. A second curvature of the surface of a wall of the recess may form a bottom of the recess, which may be U-shaped, e.g. a circular curvature with a second radius. The second curvature extends in a plane coinciding with the length direction of the housing.

The recess may also have a third curvature being perpendicular to the length direction of the housing, e.g. a circular curvature with a third radius. This helps to facilitate the free movement, e.g. rotation and/or tilting, of the air adjustment actuator within the recess. Preferably, the third curvature is adapted to the first curvature of the tubular structure of the air adjustment actuator, even if the third curvature also may be provided independently of the first and/or second curvatures.

Accordingly, the recess may have a double curvature, the curvatures preferably being perpendicular relative to each other, e.g. with one curvature forming the bottom of the U-shape of the recess and the other curvature extending perpendicularly to the length direction of the housing.

The air adjustment actuator may include, or be constituted by, an outer portion and an inner portion, the outer portion being located downstream of the inner portion as seen in the flow direction through the air vent. The outer portion may include an upper shank and a lower shank, an operative smallest distance between the upper shank and the lower shank being larger than a maximum extension of the air guide in a direction perpendicular to the length direction of the housing. The outer portion may extend above and below the air guide and in front of it, while the inner portion may be situated behind the air guide.

By utilizing the inner portion and the outer portion, the air adjustment actuator may easily be mounted to an air vent already having the fixed air guide in place, since the outer portion may be moved into the housing with the upper shank above the air guide and the lower shank below the air guide. Hence, the air adjustment actuator may be assembled after the air guide is put in place. This is especially useful for a continuous air guide.

The outer portion may be resilient. Hence, when assembling the air adjustment actuator, the distance between the shanks may be increased, e.g. in order to pass around the air guide. In such a case, the operative smallest distance between the shanks, i.e. during mounting, is larger than the smallest distance at rest.

The upper shank and the lower shank may be attachable to the inner portion, e.g. by snap-fitting or an adhesive. This facilitates easy and quick assembly of the air adjustment actuator.

The first connection and/or the second connection may be attached to, located in, operated on or constituted by the inner portion of the air adjustment actuator. As mentioned above, the first connection directly or indirectly connects the air adjustment actuator to the one or more horizontal vanes for vertical direction of the air stream and the second connection directly or indirectly connects the air adjustment actuator to the one or more vertical vanes for horizontal direction of the air stream.

The air adjustment actuator may include an indicator indicating a direction of the air stream exiting the air vent, e.g. a knob protruding in the direction away from the housing. The indicator may also include or be constituted by a marking or an indent. Since the indicator is included in the air adjustment actuator, it follows the displacement of the air adjustment actuator when adjusting the vanes. Further, the indicator may be utilized to make it easy for a user to manipulate the air adjustment actuator, e.g. by a single finger. The user may then grab or push the knob or place a finger in the indent to displace the air adjustment actuator in a desired way to adjust the direction of the air stream.

BRIEF DESCRIPTION OF THE DRAWINGS

The present disclosure will hereinafter be further explained by means of non-limiting examples with reference to the appended drawings wherein.

It should be noted that the appended drawings are schematic and that individual components are not necessarily drawn to scale and that the dimensions of some features of the present disclosure may have been exaggerated for the sake of clarity.

DESCRIPTION OF EMBODIMENTS

The disclosure will, in the following, be exemplified by embodiments. It should however be realized that the embodiments are included in order to explain principles of the disclosure and not to limit the scope of the disclosure, as defined by the appended claims. A feature from one embodiment may be combined with one or more features of any other embodiment.

Figure 1:
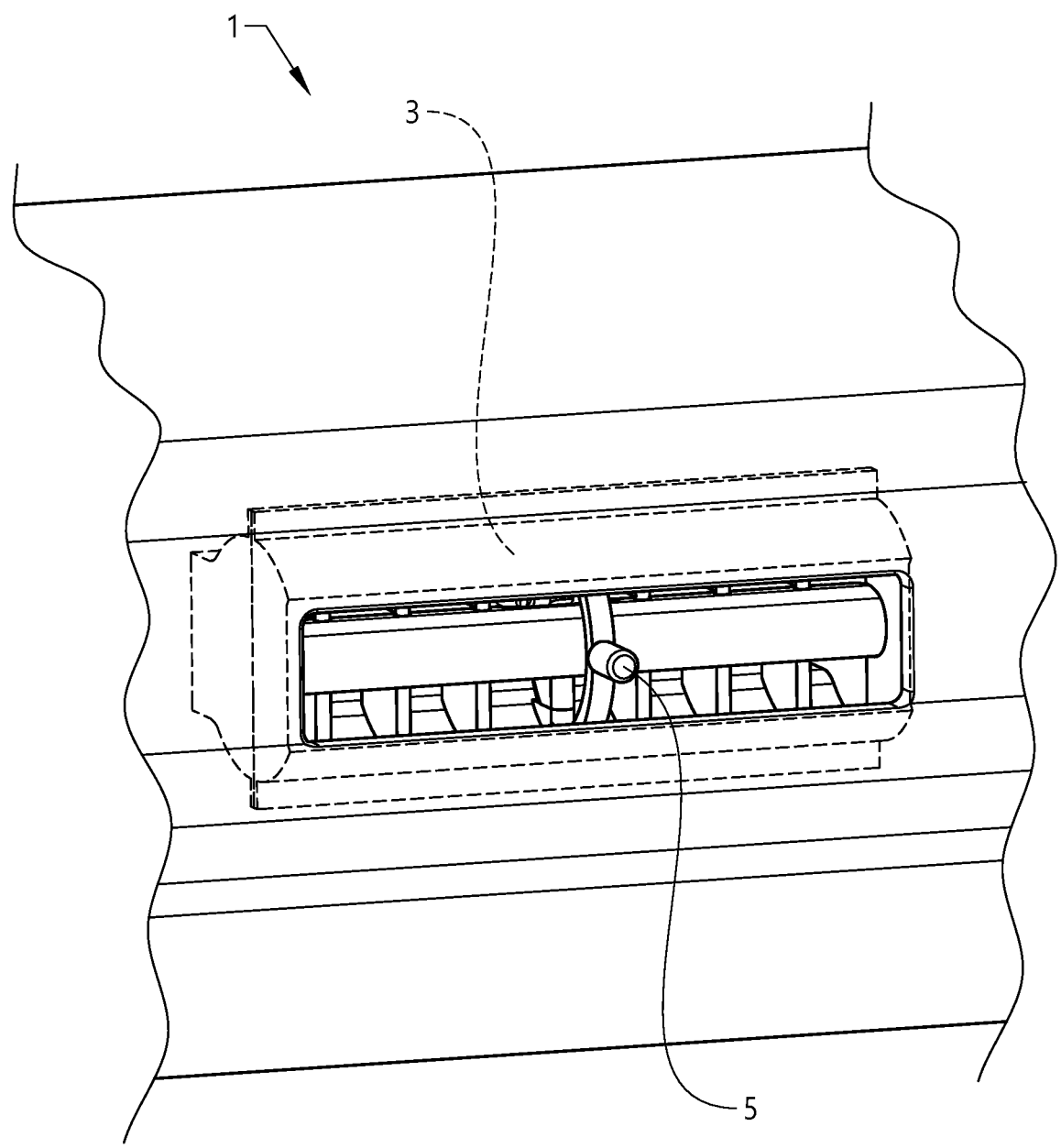
FIG. 1 is a schematic view of a dashboard including an adjustable air vent according to the disclosure.

FIG. 1 illustrates a portion of a dashboard 1 of a vehicle, here exemplified as located in a car. An adjustable air vent 3 according to the disclosure is located in the dashboard. An air stream exiting the air vent 3 may be adjusted by means of an air adjustment actuator 5 included in the air vent 3, such that an occupant of the vehicle can direct the discharged air stream in a desirable direction. The air vent 3, including the air adjustment actuator 5, is further described below.

Figure 2A:
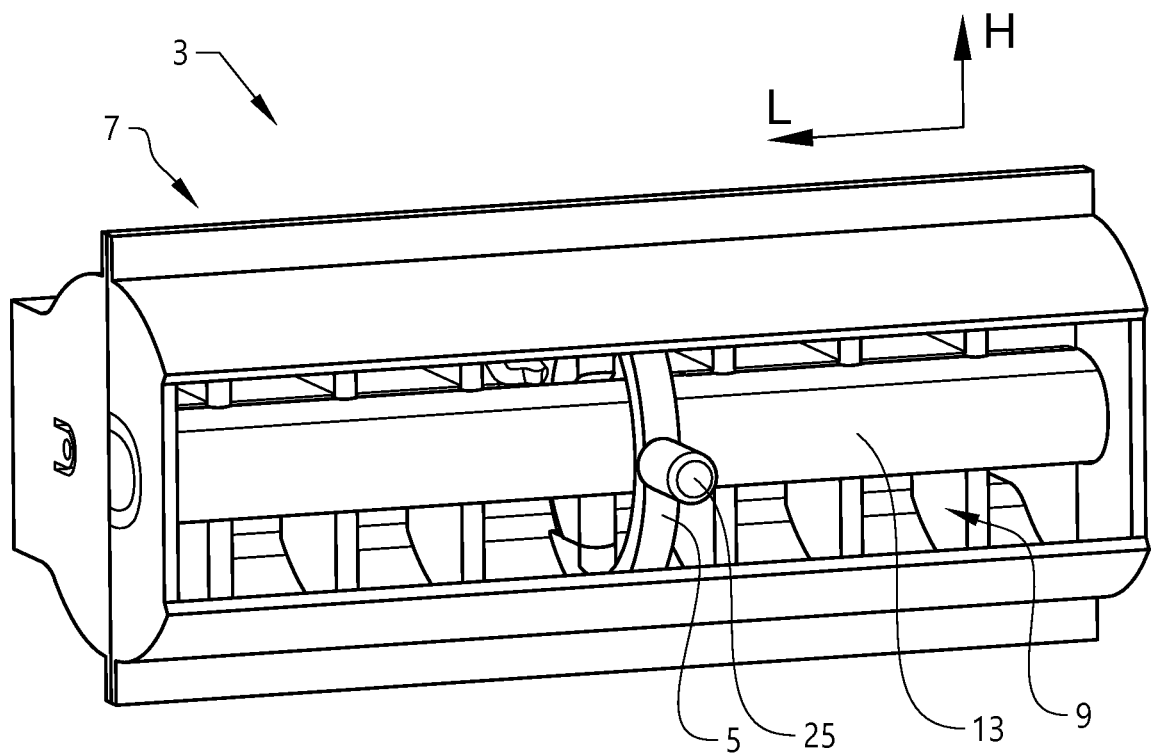
FIG. 2a is a perspective view of the air vent in a neutral position.
Figure 2B:
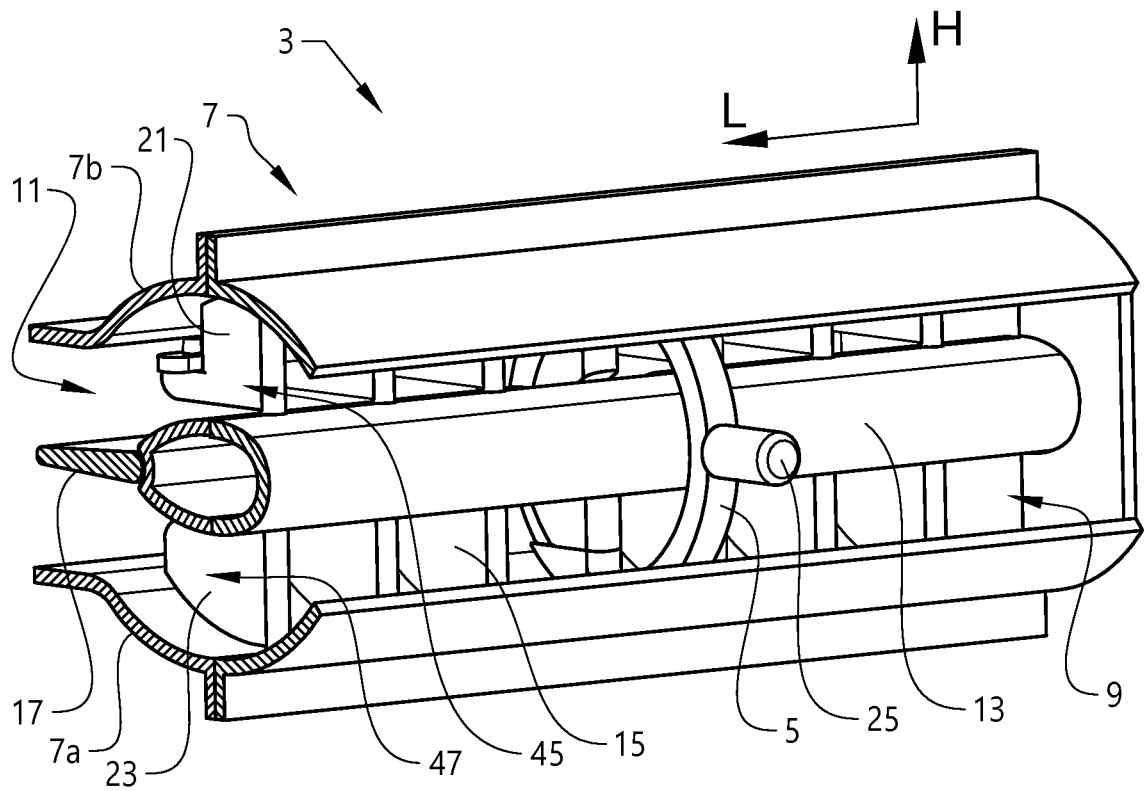
FIG. 2b is a perspective view of the air vent in a neutral position with removed side end.
Figure 3:
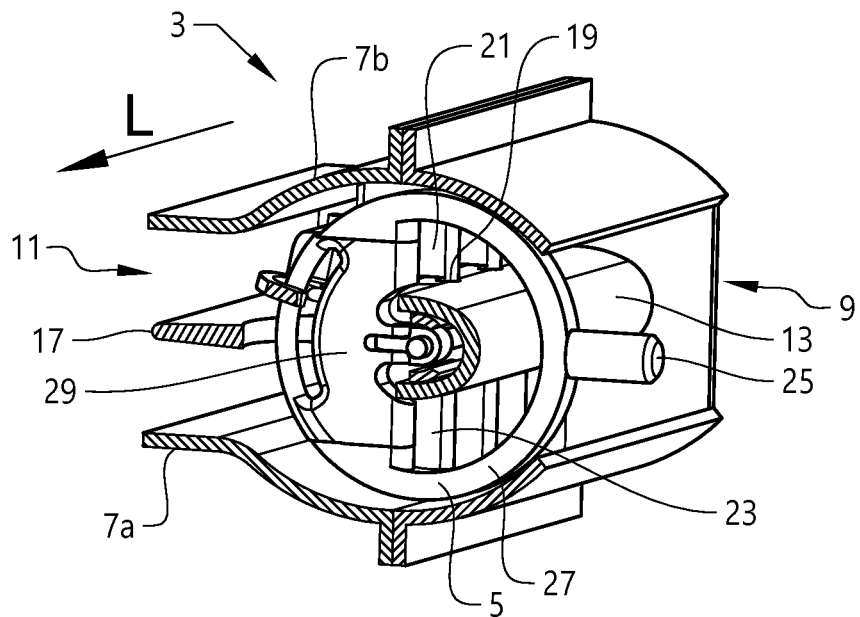
FIG. 3 is a perspective cross-sectional view of the air vent in a neutral position.

FIGS. 2a, 2b and 3 illustrate the air vent 3, in a perspective view and in a perspective cross-sectional view, respectively. In FIG. 2b the side end of the air vent 3 is removed for better visibility. The air adjustment actuator 5 is depicted in FIGS. 2a, 2b and 3 in a neutral position, i.e. the air stream is directed straight outwards from the air vent 3.

The air vent 3 includes a housing 7 including a lower portion 7a and an upper portion 7b. The housing has a substantially cylindrical shape extending in a length direction L of the housing 7, which in the embodiment depicted in FIG. 1 extends in a substantially transverse direction of the vehicle. The cross-section of FIG. 3 is taken perpendicularly to the length direction L of the housing 7. The housing 7 may form an integral part of or be integrated with the dashboard 1.

The housing 7 has an air discharge opening 9, directed towards the passenger compartment of the vehicle, and an air inlet opening 11, through which air from an HVAC system of the vehicle and/or ambient air may enter. Typically, and as is illustrated in FIGS. 2a, 2b and 3, the air discharge opening 9 is located opposite to the air inlet opening 11 and they both extend in the length direction L of the housing 7 as well as in a height direction H perpendicular thereto.

An air guide 13 is fixedly positioned at least partly inside the housing 7, in the illustrated embodiment illustrated as completely inside the housing 7, and extends in the length direction L of the housing 7. A portion of the air guide 13 is located at or adjacent to a centre of the housing 7 when seen in the cross-sectional view depicted in FIG. 3. Hence, when viewed through the air discharge opening 9, the air guide 13 is located at about half the height of the air discharge opening 9. This location of the air guide 13 is suitable for air vents 3, in which it is desirable to be able to guide an equal amount of air above and below the air guide 13. The air guide 13 divides the air stream into an upper air channel 45 above the air guide 13 and a lower air channel 47 below the air guide 13.

The air vent 3 further includes a plurality of adjustable vanes, namely a plurality of vertical vanes 15 and, in this embodiment, a single horizontal vane 17. The vertical vanes 15 are adapted to direct the air stream in a selectable horizontal direction, while the horizontal vane 17 controls how much air flows above and below the air guide 13, respectively, thus making it possible to select the vertical direction of the discharged air stream. Together the vanes can direct the air stream in any desirable direction out from the air vent 3.

In the illustrated embodiment, the horizontal vane 17 is located closest to the air inlet opening 11. The vertical vanes 15 are located between the air guide 13 and the horizontal vane 17. The vertical vanes are located in slots 19 in the air guide 13, see FIG. 3. Each vertical vane 15 includes an upper portion 21 and a lower portion 23, which protrude above and below the air guide 13 and the horizontal vane 17, respectively. This makes it possible to have a rather compact air vent 3.

An indicator in the form of a knob 25 associated the air adjustment actuator 5 makes it easy for the vehicle occupant to actuate the air adjustment actuator 5, since the knob 25 is easy to grab and may also be actuated with a single finger. Moreover, and as is further described below, the knob 25 indicates the direction of the discharged air stream.

The air adjustment actuator 5 is connected to both the horizontal vane 17 and the vertical vanes 15, such that a vertical adjustment of the air adjustment actuator 5, i.e. rotating it in an upwards or downward direction, effects an angular displacement of the horizontal vane 17 and a horizontal adjustment effects an angular displacement of the vertical vanes 15. This is further described below. With the air vent 3 including the air adjustment actuator 5 according to the disclosure, it is possible to make a stepless adjustment in any direction, i.e. not only vertically and/or horizontally as in prior art solutions.

The air adjustment actuator 5 completely surrounds the air guide 13. It includes an outer portion 27 and an inner portion 29. The outer portion 27 extends above and below the air guide 13 and in front of it, while the inner portion 29 is situated behind the air guide 13 as seen from the air discharge opening 9.

Figure 4:
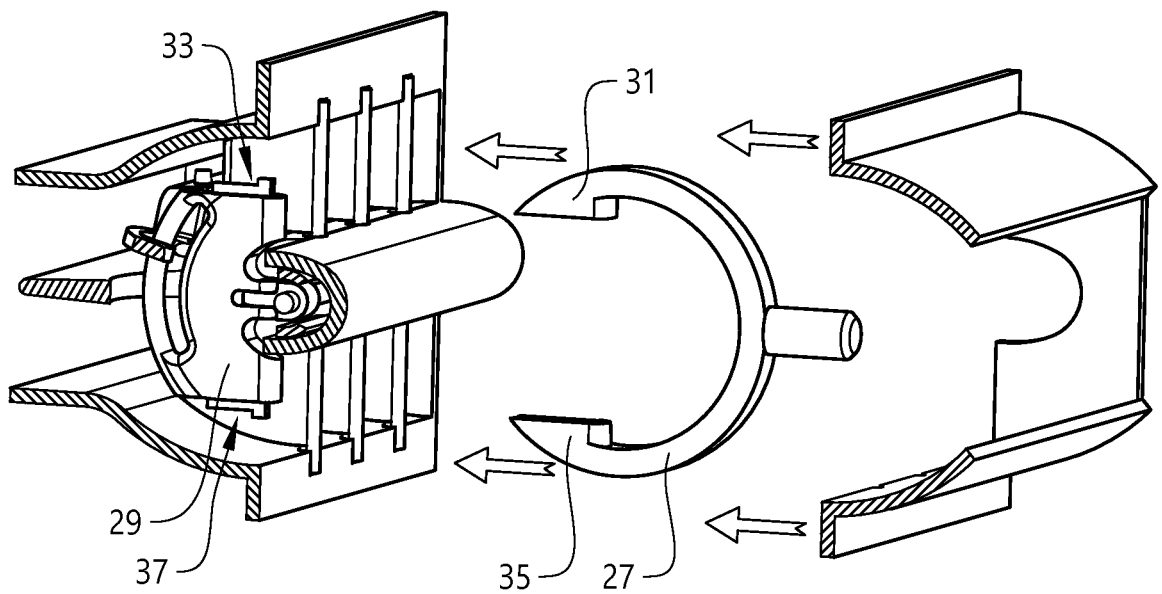
FIG. 4 illustrates assembly of the air vent.

When assembling the air adjustment actuator 5, see FIG. 4, the outer portion 27 is moved into the housing 7 until an upper shank 31 of the outer portion 27 meets a top surface 33 of the inner portion 29 and a lower shank 35 meets a bottom surface 37 of the inner portion 29. The upper shank 31 is attachable to the top surface 33, e.g. by snap-fitting or an adhesive. Correspondingly, the lower shank 35 is attachable to the bottom surface 37, e.g. by snap-fitting or an adhesive. FIG. 4 shows the assembling of the air adjustment actuator 5 and FIG. 3 shows the air adjustment actuator 5 when assembled.

By utilizing the air vent 3 according to the disclosure, it is possible to assemble the air adjustment actuator 5 without removing the air guide 13 or having to have a slot or a split-line in the air guide 13 for receiving the air adjustment actuator 5, as is common in the prior art. Hence, it is possible to use an air guide 13 which is continuous as seen in the length direction L of the air vent, even though the air adjustment actuator 5 is positioned at the air vent 3 and not separately at the side of the air vent 3. This is advantageous, since in this manner a complicated linkage system between the air adjustment actuator 5 and the vertical vanes 15, and between the air adjustment actuator 5 and the horizontal vane 17, may be avoided.

In the illustrated air vent 3, the air adjustment actuator 5 is located at the centre of the air discharge opening 9 as seen in the length direction L of the housing 7. However, it would be feasible to position the air adjustment actuator 5 in any arbitrary position along the air guide 13 as seen in the length direction L of the housing 7. Further, more than one air adjustment actuator 5 may be provided in the air vent 3, each of them controlling a subgroup of the vanes 15, 17.

Figure 5:
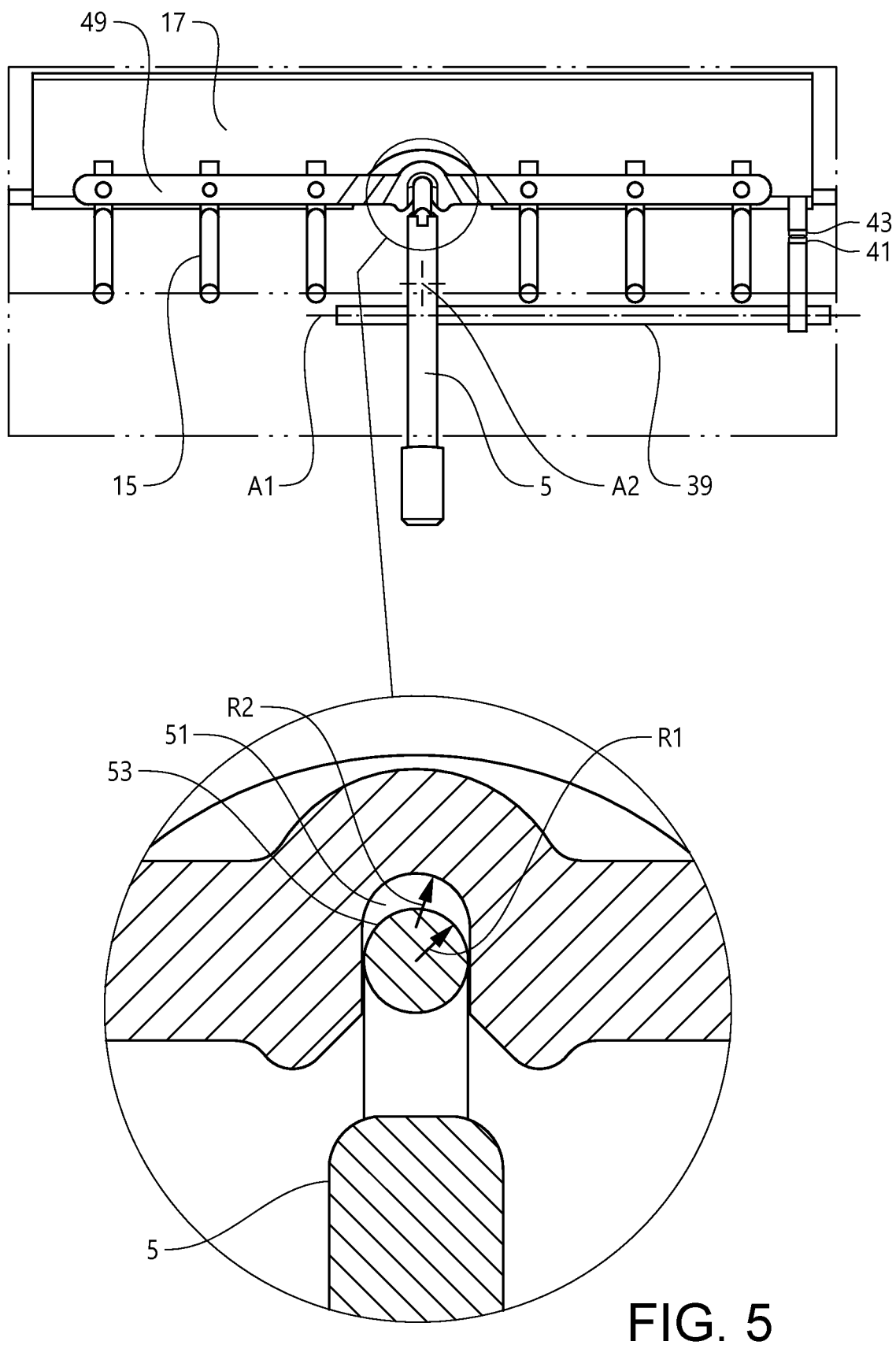
FIG. 5 is an internal top view of the air vent in the neutral position.
Figure 6:
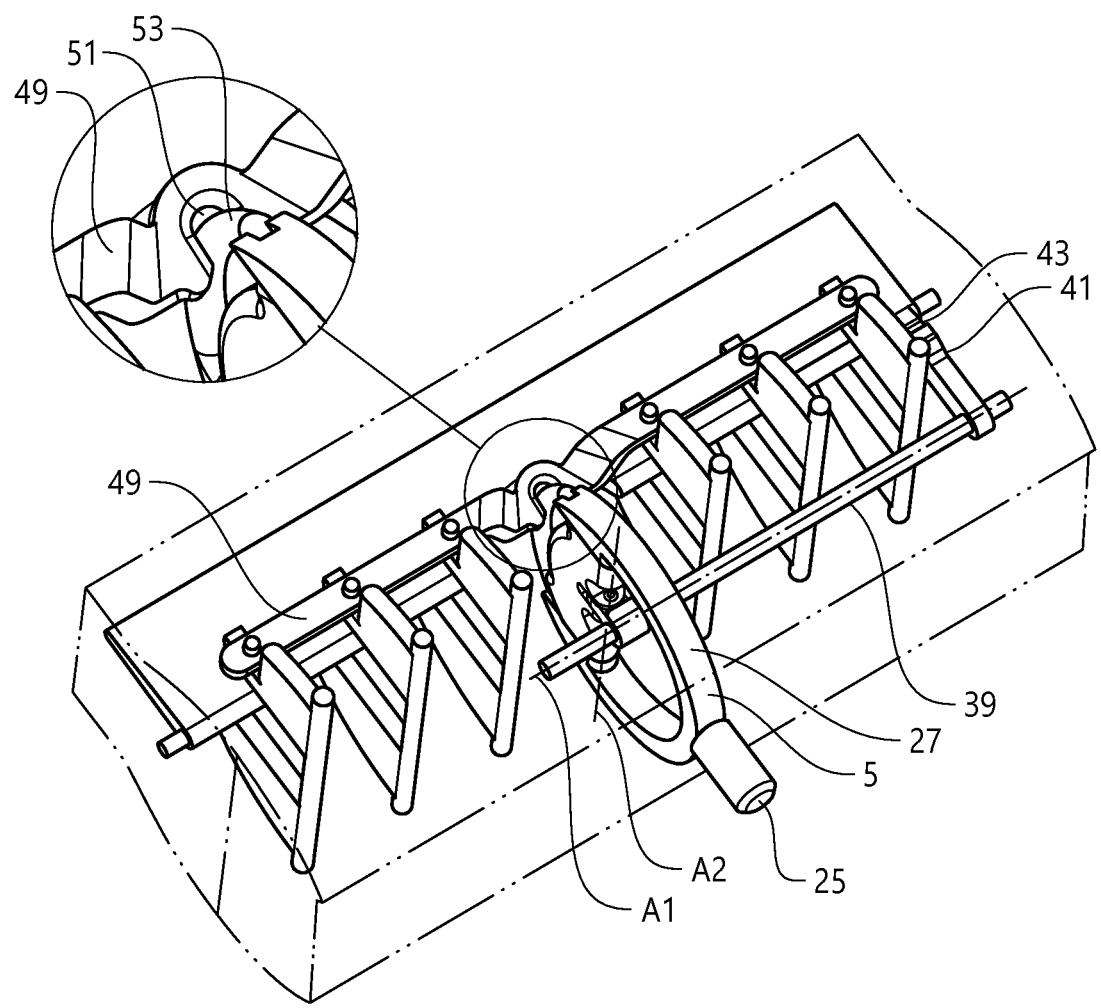
FIG. 6 is an internal perspective view of the air vent in the neutral position.
Figure 7:
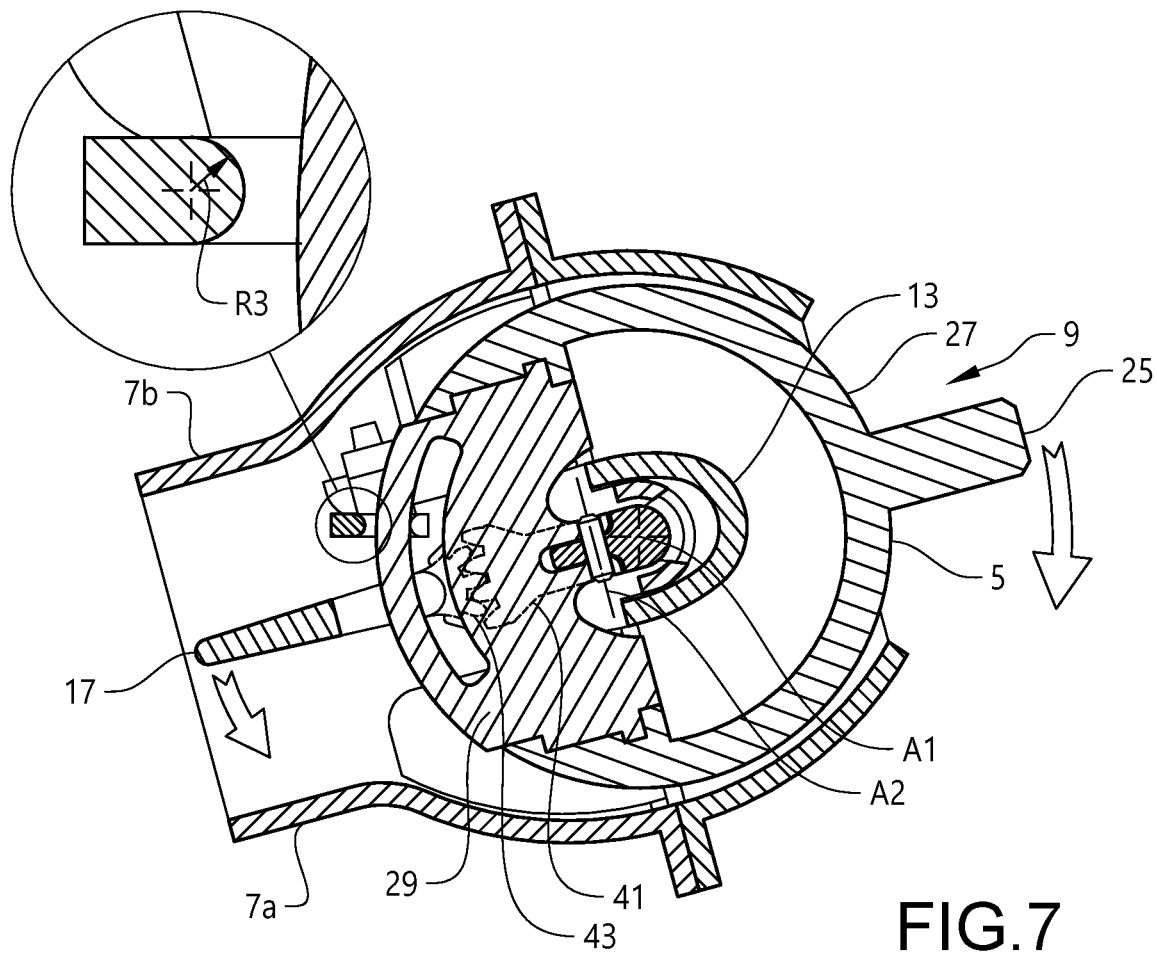
FIG. 7 is a cross-sectional view of the air vent in the neutral position.

The air adjustment actuator 5 is connected to a spindle 39, which forms a first rotation axis A1. This may best be gleaned from FIGS. 5 and 6 showing some of the internal parts of the air vent 3, with FIG. 5 showing a top view and FIG. 6 showing an internal perspective view. The air guide 13 is removed in the illustration of FIGS. 5 and 6 for better visibility. In the illustrated embodiment, the air adjustment actuator 5 has a circular shape with the outer portion 27 forming a little more than a half annulus. The first rotation axis A1 is in the centre of the circular shape. The first rotation axis A1 has a fixed position in relation to the air vent 3 with the first rotation axis A1 being rotatable around its length axis. The length axis of the first rotation axis A1 is parallel to the length direction L of the housing 7. The first rotation axis A1 may be located within the air guide 13, as in the illustrated embodiment, see e.g. FIG. 7 described below.

The air adjustment actuator 5 also has a second rotation axis A2, which is located behind the first rotation axis A1 as seen from the air discharge opening 9. The second rotation axis A2 is constituted by portions of the inner portion 29 of the air adjustment actuator 5. The second rotation axis A2 is rotatable around its length axis. In the neutral position of the air vent 3 depicted in FIGS. 2a-6, the second rotation axis A2 extends in the vertical direction. However, the second rotation axis A2 is rotatable around the first rotation axis A1, as is further described below.

The spindle 39 is connected to the horizontal vane 17 via a first connection portion 41 attached to the spindle 39 and a second connection portion 43 attached to the horizontal vane 17, e.g. by cogs engaging with corresponding cogs of the horizontal vane 17. Thereby an up/down-displacement of the air adjustment actuator 5 via rotation around the first rotation axis A1 is transferred to an up/down tilting of the horizontal vane 17. In this rotation, the second rotation axis A2 follows the displacement of the air adjustment actuator 5 and thus rotates around the first rotation axis A1. This may be gleaned when comparing the neutral position of the air adjustment actuator 5, shown in the cross-sectional view of FIG. 7, with the air adjustment actuator 5 when pushed downwards, i.e. rotated downwards around the first rotation axis A1, see FIG. 8.

Figure 8:
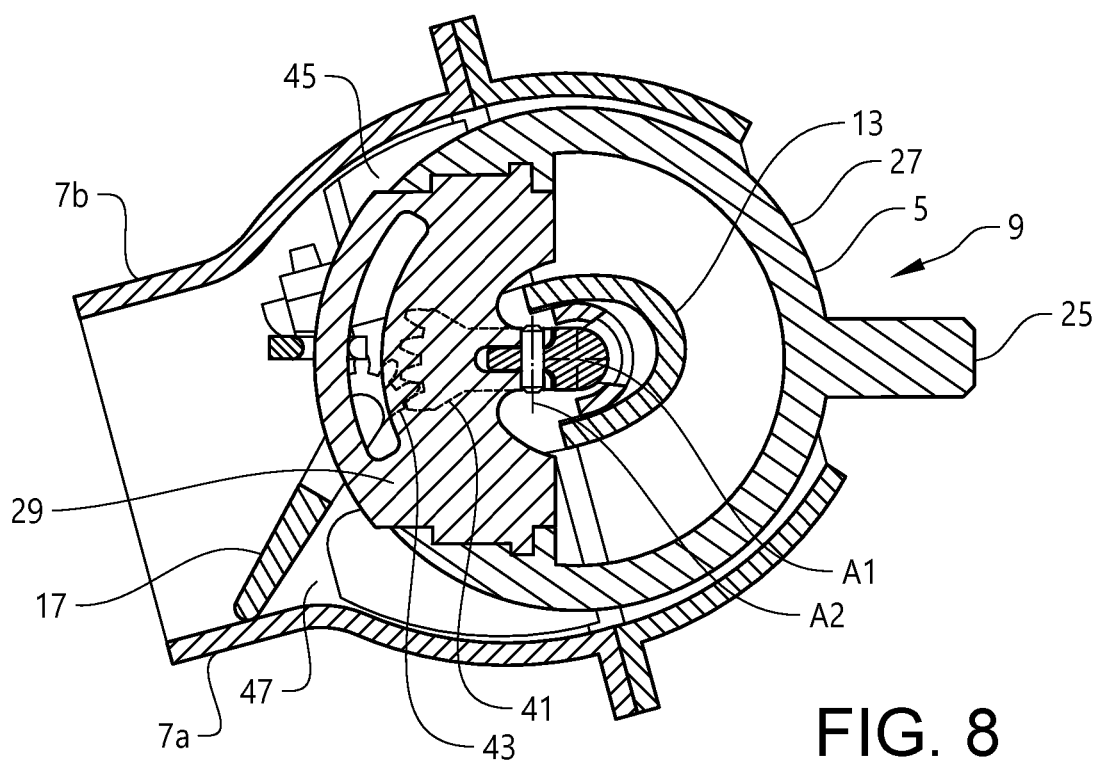
FIG. 8 is a cross-sectional view of the air vent after vertical adjustment.

As can be seen in FIG. 8, the horizontal vane 17 more or less blocks the lower air channel 47 below the air guide 13, such that a main portion of the air stream, illustrated as substantially the whole air stream flows in the upper air channel 45 above the fixed air guide 13. Hence, when the air stream reaches the air discharge opening 9, the air stream will be directed obliquely downwards, as is indicated by the protrusion direction of the knob 25. The up/down-displacement of the air adjustment actuator 5 may be made steplessly.

The knob 25 is preferably elongate such that a line following the protrusion direction of the knob 25 intersects with the first rotation axis A1 and the second rotation axis A2 at or adjacent to a projected intersection of the first rotation axis A1 and the second rotation axis A2. Hence that line passes the centre of the circular shape of the air adjustment actuator 5.

Reverting to FIGS. 5 and 6 showing the neutral position of the air adjustment actuator 5, it is shown that the air adjustment actuator 5 is connected to the vertical vanes 15 by means of a bar 49, which is connected to each vertical vane 15, such that they can be displaced in synchrony. The inner portion 29 of the air adjustment actuator 5 fits in a U-shaped recess 51 in the bar 49. The inner portion 29 includes a curved tubular structure 53 forming a portion of its circumference. The surface of the tubular structure 53 has a first curvature, depicted as a circular curvature with a first radius $R_1$, see detailed view at FIG. 5 showing a cross-section of the tubular structure 53. A second curvature of the surface of the wall of the recess 51 forms the bottom of the U-shape, depicted as a circular curvature with a second radius $R_2$. The U-shaped recess 51 is configured such that the curved tubular structure 53 of the inner portion 29 can move freely within the U-shaped recess 51. Hence, the second curvature of the recess 51 is adapted to allow free movement of the air adjustment actuator 5, e.g. rotation and/or tilting. The second curvature $R_2$ of the recess 51 extends in a plane coinciding with the length direction L of the housing 7.

Figure 9:
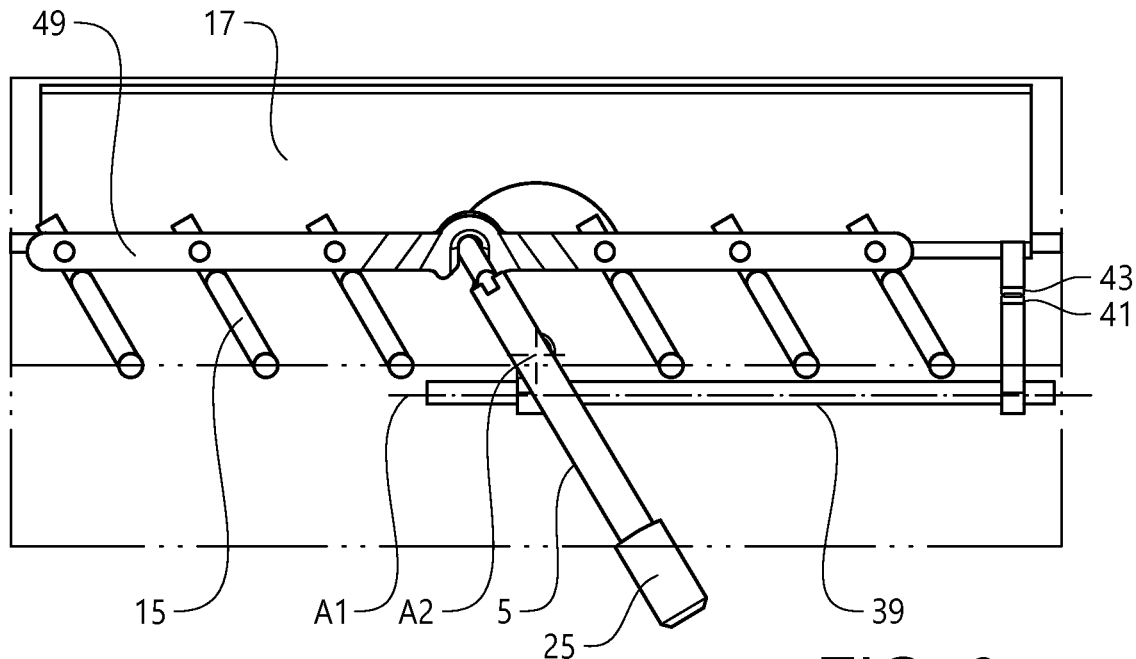
FIG. 9 is an internal top view of the air vent after horizontal adjustment.
Figure 10:
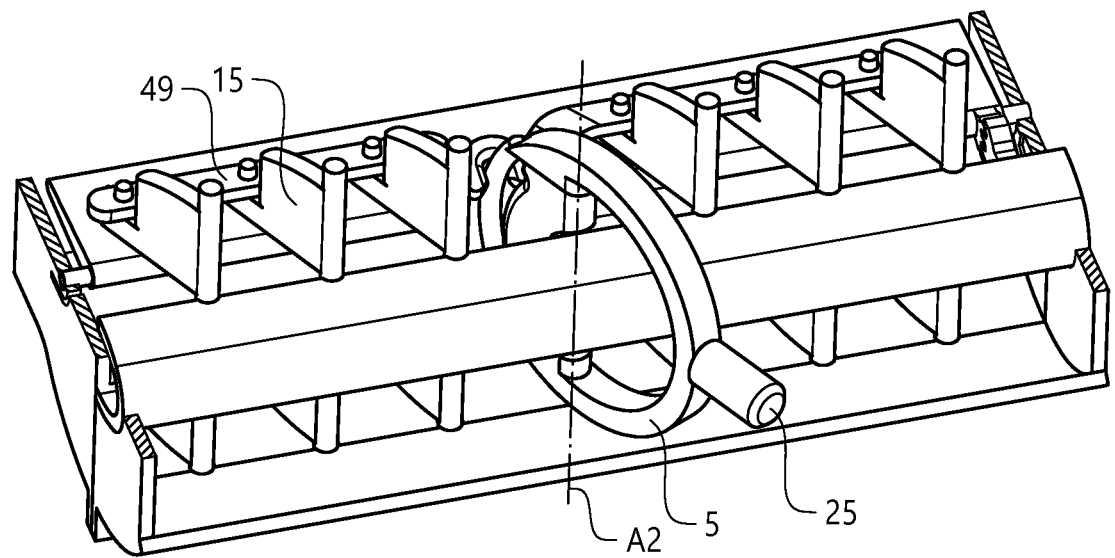
FIG. 10 is a perspective view of the air vent after horizontal adjustment.

When moving the air adjustment actuator 5 to the right, e.g. by grabbing the knob 25 and redirecting it, the air adjustment actuator 5 rotates around the second rotation axis A2, see the top view in FIG. 9 and the perspective view of FIG. 10. Thereby, the bar 49 is linearly displaced in the length direction L of the housing 7 and the vertical vanes 15 are tilted correspondingly by means of the bar 49. Accordingly, the air stream is directed obliquely to the right when exiting the air vent 3 through the air discharge opening 9. This horizontal displacement may be made steplessly. A corresponding angling of the air adjustment actuator 5 and the vertical vanes 15 may be made to the left, not illustrated.

Moreover, and as mentioned above, it is possible to make a stepless adjustment by moving the air adjustment actuator 5 in any direction, i.e. not only vertically and/or horizontally as in prior art solutions, but in any direction therebetween. Thereby, the vertical and horizontal adjustments described above are combined and performed at the same time, see FIGS. 11-12 with FIG. 11 showing a top view and FIG. 12 showing a perspective view.

In the combined adjustment, the air adjustment actuator 5 is rotated around the first rotation axis A1 and at the same time the air adjustment actuator 5 is also rotated around the second rotation axis A2. The horizontal vane 17 is tilted downwards due to the downward rotational displacement of the air adjustment actuator 5. In addition, the air adjustment actuator 5 is tilted to the right, thereby also titling the vertical vanes 15.

Figure 11:
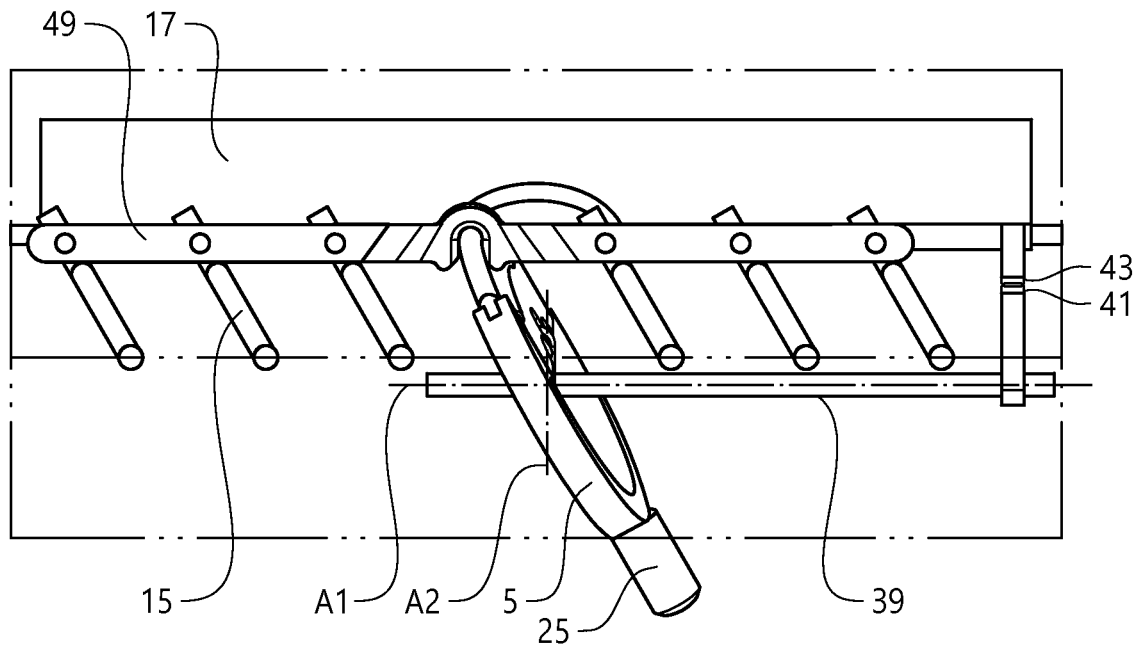
FIG. 11 is an internal top view of the air vent after combined adjustment.
Figure 12:
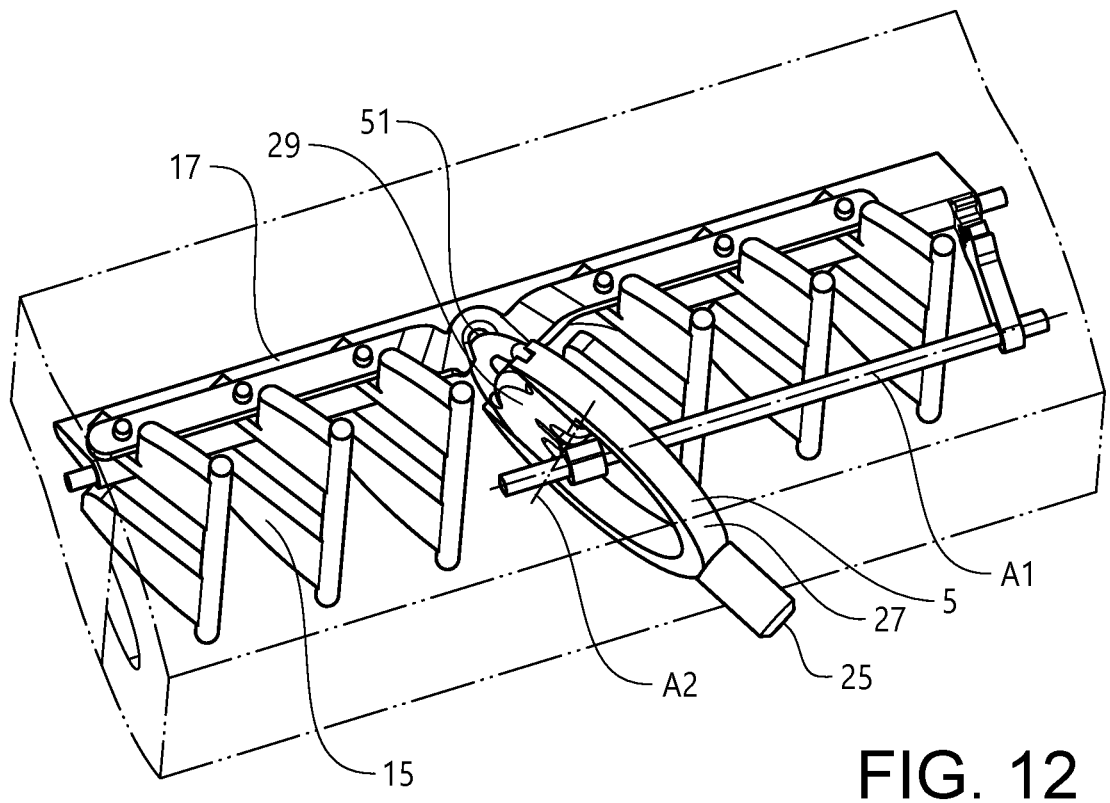
FIG. 12 is an internal perspective view of the air vent after combined adjustment.

As a result of the combined adjustment, the air adjustment actuator 5 is positioned slightly obliquely in the U-shaped recess 51 in the bar 49 connecting the air adjustment actuator 5 to the vertical vanes 15, which is best seen if comparing FIGS. 9 and 11. In order to be able to allow such a movement of the air adjustment actuator 5 within the U-shaped recess 51, the surface of the wall of the recess 51 has a double curvature. The above-mentioned second curvature $R_2$ forms the bottom of the U-shape. A third curvature, depicted as a circular curvature with a third radius $R_3$, being perpendicular to the second curvature $R_2$, allows the air adjustment actuator 5 to be obliquely positioned in the recess 51, see the detailed view depicted at FIG. 7.

Figure 13:
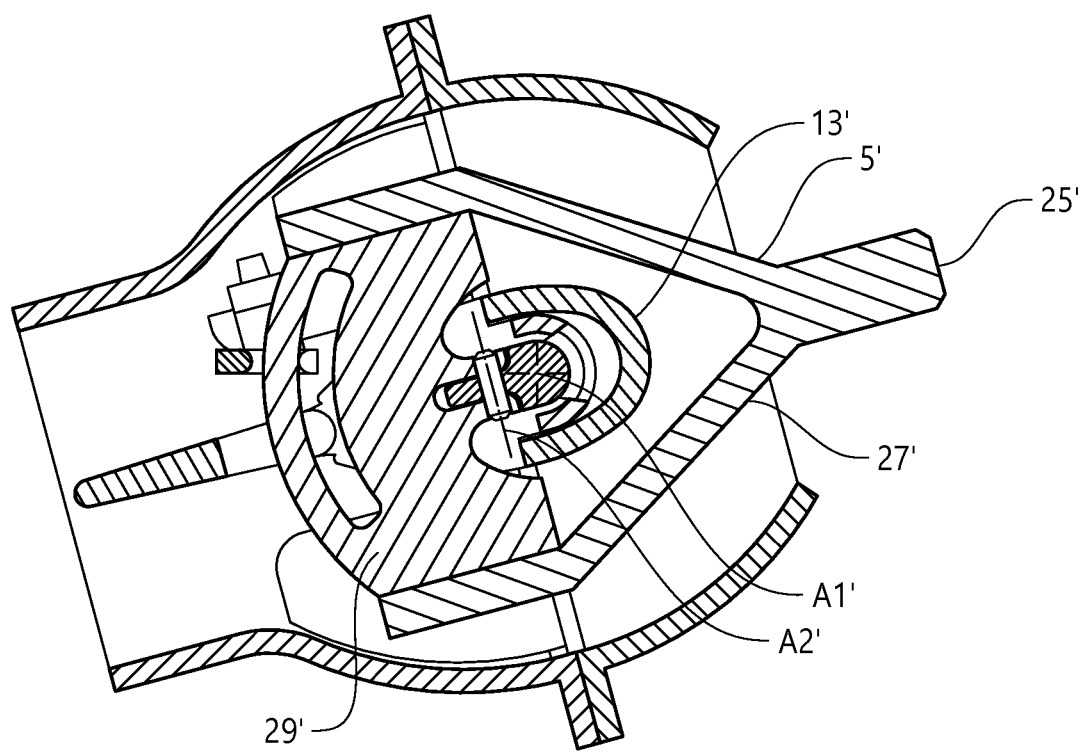
FIG. 13 illustrates an alternative configuration of the air adjustment actuator in an air vent according to the disclosure.

FIG. 13 illustrates an alternative configuration of the air adjustment actuator 5', which has a non-circular shape. The first and second rotation axes A1', A2' correspond to those described above. The air adjustment actuator 5' includes an outer portion 27' and an inner portion 29', which are snap-fittable to each other or connectable in any other way, e.g. by means of an adhesive.

In principle, the air adjustment actuator 5, 5' may have any shape as long as it is possible to reach by a user to be adjusted, e.g. by means of the above-mentioned knob 25, 25' surrounds the air guide 13, 13' and can be rotated within a predefinable adjustment range without interfering with the housing 7.

Further modifications of the disclosure within the scope of the appended claims are feasible. As such, the present disclosure should not be considered as limited by the embodiments and figures described herein. Rather, the full scope of the disclosure should be determined by the appended claims, with reference to the description and drawings.

The invention claimed is:

1. An adjustable air vent which is adapted to guide an air stream flowing through said air vent, said air vent comprising:
   an elongate housing extending in a length direction (L),
   one or more vertical vanes, at least partly located in said housing,
   one or more horizontal vanes, at least partly located in said housing,
   an air guide, at least partly located within said housing, fixedly positioned in relation to said housing and extending in said length direction (L),
   an air adjustment actuator being displaceable in relation to said housing to adjust a direction of said air stream,
   a first connection directly or indirectly connecting said air adjustment actuator to said one or more horizontal vanes for vertical direction of said air stream, and
   a second connection directly or indirectly connecting said air adjustment actuator to said one or more vertical vanes for horizontal direction of said air stream,
   wherein said air adjustment actuator surrounds said air guide and is displaceable relative thereto, and
   wherein said air adjustment actuator has a closed circumference surrounding said air guide, said circumference being circular.

2. The air vent of claim 1, wherein said air guide extends continuously in said length direction (L) within said housing, said air guide extending along the whole length of said housing.

3. The air vent of claim 1, wherein, as seen in a flow direction through said air vent, said air guide is downstream of said one or more vertical vanes and said one or more horizontal vanes, said air guide being downstream of said one or more vertical vanes, which in turn are downstream of said one or more horizontal vanes.

4. The air vent of claim 1, wherein said first connection comprises a spindle forming a first rotation axis (A1) of said air adjustment actuator, said spindle extending in said length direction (L) of said housing and having a fixed position relative to said air guide.

5. The air vent of claim 4, wherein said air adjustment actuator comprises one or more portions forming a second rotation axis (A2) of said air adjustment actuator, said second rotation axis (A2) extending in a direction perpendicular to said length direction (L) of said housing, when said air vent is in a neutral position.

6. The air vent of claim 5, wherein said one or more portions of said air adjustment actuator forming said second rotation axis (A2) is rotatable around said spindle of said first connection forming said first rotation axis (A1).

7. The air vent of claim 5, wherein said second rotation axis (A2) is located upstream of said first rotation axis (A1) as seen in a flow direction through said air vent.

8. The air vent of claim 1, wherein said second connection comprises a bar extending in said length direction (L) of said housing and connecting said air adjustment actuator to said one or more vertical vanes.

9. The air vent of claim 8, wherein said bar comprises a recess adapted to receive a portion of said air adjustment actuator, said recess being U-shaped.

10. The air vent of claim 9, wherein said recess has a double curvature, being perpendicular relative to each other, with one curvature (R2) forming a bottom of said U-shape of the recess and another curvature (R3) extending perpendicularly to said length direction (L) of said housing.

11. The air vent of claim 1, wherein said air adjustment actuator comprises an outer portion and an inner portion, said outer portion being located downstream of said inner portion as seen in said flow direction through said air vent, wherein said outer portion comprises an upper shank and a lower shank, an operative smallest distance between said upper shank and said lower shank being larger than a maximum extension of said air guide in a direction perpendicular to said length direction (L) of said housing.

12. The air vent of claim 11, wherein said upper shank and said lower shank are attachable to said inner portion.

13. The air vent of claim 11, wherein one or more of said first connection and said second connection is/are attached to, located in, operated on, or constituted by said inner portion.

14. The air vent of claim 1, wherein said air adjustment actuator comprises an indicator indicating a direction of said air stream exiting said air vent.

15. The air vent of claim 1, wherein said air adjustment actuator surrounds said air guide and is rotationally displaceable relative thereto.

16. The air vent of claim 7, wherein said second rotation axis (A2) is located upstream of said first rotation axis (A1) as seen in said flow direction through said air vent, adjacent to said first rotation axis (A1).

* * * * *